US009311616B2

(12) United States Patent
Westerlage et al.

(10) Patent No.: US 9,311,616 B2
(45) Date of Patent: Apr. 12, 2016

(54) SYSTEM AND METHOD FOR DETERMINING EQUIPMENT UTILIZATION CHANGES BASED ON IGNITION AND MOTION STATUS (75) Inventors: Kenneth R. Westerlage, Fort Worth, TX (US); Larry V. Stricker, Frisco, TX (US); William C. Kennedy, III, Dallas, TX (US)

(73) Assignee: On-Board Communications, Inc., Dallas, TX (US)

( * ) Notice: Subject to any disclaimer, the term of this patent is extended or adjusted under 35 U.S.C. 154(b) by 691 days.

(21) Appl. No.: 12/814,859

(22) Filed: Jun. 14, 2010

(65) Prior Publication Data

US 2011/0307141 A1    Dec. 15, 2011

(51) Int. Cl.
G06Q 10/00 (2012.01)
B60R 25/10 (2013.01)
G07C 5/08 (2006.01)
G07C 5/00 (2006.01)
G06Q 10/06 (2012.01)
B60R 25/045 (2013.01)
(Continued)

(52) U.S. Cl.
CPC ........ G06Q 10/06315 (2013.01); B60R 25/045 (2013.01); G06Q 30/0283 (2013.01); G07C 5/006 (2013.01); G07C 5/008 (2013.01); G07C 5/08 (2013.01); G07C 5/085 (2013.01); G08G 1/20 (2013.01)

(58) Field of Classification Search
CPC ....... G06F 17/00; G06F 11/30; F02D 11/105; B60T 8/885; B60T 8/92; G07C 5/008; G07C 5/02; G07C 5/00; G07C 5/08; G07C 5/006; B60R 25/045; B60R 25/1004; B60R 25/2009; B60R 25/00; B60R 25/23; B60R 25/2018; B60R 25/042; B60R 25/20; G06Q 10/20; G06Q 10/06315
USPC ........ 701/29.1, 29.8, 30.4, 31.4, 34.3, 66, 86, 701/97, 112, 113, 114, 123, 29.2, 29.3, 701/29.4, 33.6; 705/305, 7.25; 180/173, 180/174; 340/426.24, 426.25, 426.3, 340/995.28, 593, 615, 5.62
See application file for complete search history.

(56) References Cited

U.S. PATENT DOCUMENTS 5,124,565 A *  6/1992 Yoshida et al. .............. 340/5.61
5,381,128 A *  1/1995 Kaplan ..................... 340/426.17
(Continued)

FOREIGN PATENT DOCUMENTS

WO    WO 2007/039792    4/2007

OTHER PUBLICATIONS

Skybitz webpages, service plans, archives-org, 2008 www.skybitz.com.*

(Continued)

Primary Examiner — Octavian Rotaru
(74) Attorney, Agent, or Firm — Baker Botts L.L.P.

(57) ABSTRACT

A method for measuring vehicle utilization includes determining, with an ignition sensor, an ignition status of a vehicle and determining, with a motion sensor, a motion status of the vehicle. The method further includes determining a utilization of the vehicle based, at least in part, on the ignition status and the motion status. Additionally, the method includes transmitting status information to a location remote from the vehicle. The status information indicates at least one of the ignition status, the motion status, and the utilization.

18 Claims, 4 Drawing Sheets

(51) Int. Cl.
*G06Q 30/02* (2012.01)
*G08G 1/00* (2006.01)

(56) References Cited

U.S. PATENT DOCUMENTS

| | | | |
|---|---|---|---|
| 5,659,470 A * | 8/1997 | Goska et al. | 701/33.4 |
| 5,742,227 A * | 4/1998 | Escareno et al. | 340/426.21 |
| 5,797,107 A * | 8/1998 | Berg et al. | 701/32.3 |
| 5,838,227 A * | 11/1998 | Murray | 340/539.21 |
| 5,867,801 A * | 2/1999 | Denny | 701/33.4 |
| 5,926,086 A * | 7/1999 | Escareno et al. | 340/426.21 |
| 5,937,823 A * | 8/1999 | Reeder et al. | 123/335 |
| 5,939,975 A * | 8/1999 | Tsuria et al. | 340/426.18 |
| 5,970,481 A * | 10/1999 | Westerlage et al. | 705/417 |
| 5,973,411 A * | 10/1999 | Tado et al. | 307/10.5 |
| 6,028,507 A * | 2/2000 | Banks et al. | 340/427 |
| 6,028,537 A * | 2/2000 | Suman et al. | 340/988 |
| 6,067,044 A * | 5/2000 | Whelan et al. | 342/357.74 |
| 6,072,248 A * | 6/2000 | Muise et al. | 307/10.2 |
| 6,141,610 A * | 10/2000 | Rothert et al. | 701/33.4 |
| 6,198,996 B1 * | 3/2001 | Berstis | 701/36 |
| 6,253,129 B1 * | 6/2001 | Jenkins et al. | 701/32.3 |
| 6,259,362 B1 * | 7/2001 | Lin | 340/457 |
| 6,339,745 B1 * | 1/2002 | Novik | 701/431 |
| 6,359,570 B1 * | 3/2002 | Adcox et al. | 340/902 |
| 6,366,198 B1 * | 4/2002 | Allen et al. | 340/426.17 |
| 6,386,128 B1 * | 5/2002 | Svoboda et al. | 111/200 |
| 6,411,887 B1 * | 6/2002 | Martens et al. | 701/115 |
| 6,549,130 B1 * | 4/2003 | Joao | 340/539.14 |
| 6,680,675 B1 * | 1/2004 | Suzuki | 340/988 |
| 6,693,563 B2 * | 2/2004 | Flick | 340/989 |
| 6,700,533 B1 * | 3/2004 | Werb et al. | 342/357.48 |
| 6,791,456 B2 * | 9/2004 | Nakayama et al. | 340/429 |
| 6,832,140 B2 | 12/2004 | Fan et al. | |
| 6,832,141 B2 * | 12/2004 | Skeen et al. | 701/31.4 |
| 6,847,892 B2 * | 1/2005 | Zhou et al. | 701/408 |
| 6,856,879 B2 | 2/2005 | Arakawa et al. | |
| 6,975,941 B1 * | 12/2005 | Lau et al. | 701/491 |
| 7,117,075 B1 * | 10/2006 | Larschan et al. | 701/29.6 |
| 7,386,376 B2 * | 6/2008 | Basir et al. | 701/33.4 |
| 7,398,153 B2 * | 7/2008 | Workman et al. | 701/517 |
| 7,406,399 B2 * | 7/2008 | Furem et al. | 702/182 |
| 7,545,258 B2 * | 6/2009 | Endo | 340/426.11 |
| 7,778,894 B2 * | 8/2010 | Monsor et al. | 705/31 |
| 7,880,631 B1 * | 2/2011 | Herz | 340/632 |
| 8,140,358 B1 * | 3/2012 | Ling et al. | 705/4 |
| 2002/0128769 A1 * | 9/2002 | Der Ghazarian et al. | 701/207 |
| 2002/0186144 A1 * | 12/2002 | Meunier | 340/825.28 |
| 2003/0093199 A1 * | 5/2003 | Mavreas | 701/33 |
| 2003/0171860 A1 * | 9/2003 | Fan et al. | 701/33 |
| 2003/0206102 A1 * | 11/2003 | Joao | 340/539.1 |
| 2003/0210129 A1 * | 11/2003 | Aslund et al. | 340/5.31 |
| 2004/0024502 A1 * | 2/2004 | Squires et al. | 701/33 |
| 2004/0148083 A1 * | 7/2004 | Arakawa et al. | 701/50 |
| 2005/0156706 A1 * | 7/2005 | Dawson et al. | 340/5.72 |
| 2005/0242971 A1 * | 11/2005 | Dryer | 340/870.11 |
| 2005/0269149 A1 * | 12/2005 | Harumoto et al. | 180/274 |
| 2006/0089789 A1 * | 4/2006 | Bishop | 701/207 |
| 2006/0106537 A1 * | 5/2006 | Hamrick et al. | 701/213 |
| 2006/0122749 A1 * | 6/2006 | Phelan et al. | 701/35 |
| 2006/0136291 A1 * | 6/2006 | Morita et al. | 705/13 |
| 2006/0200286 A1 * | 9/2006 | Kumagai et al. | 701/35 |
| 2006/0229780 A1 * | 10/2006 | Underdahl et al. | 701/35 |
| 2006/0238340 A1 * | 10/2006 | Harvey | 340/550 |
| 2006/0244626 A1 * | 11/2006 | Beyene | 340/825.37 |
| 2007/0001831 A1 * | 1/2007 | Raz et al. | 340/439 |
| 2007/0057779 A1 * | 3/2007 | Battista et al. | 340/425.5 |
| 2007/0106437 A1 * | 5/2007 | Kim et al. | 701/29 |
| 2007/0124039 A1 * | 5/2007 | Sakurai et al. | 701/29 |
| 2007/0135978 A1 * | 6/2007 | Kim et al. | 701/29 |
| 2007/0139114 A1 * | 6/2007 | Nishino | 330/254 |
| 2007/0149184 A1 * | 6/2007 | Viegers et al. | 455/422.1 |
| 2007/0168104 A1 * | 7/2007 | Nelson et al. | 701/93 |
| 2007/0213896 A1 * | 9/2007 | Fischer | 701/35 |
| 2007/0260375 A1 * | 11/2007 | Hilton | 701/35 |
| 2008/0015955 A1 * | 1/2008 | Ehrman et al. | 705/28 |
| 2008/0114502 A1 * | 5/2008 | Breed et al. | 701/2 |
| 2008/0154691 A1 * | 6/2008 | Wellman et al. | 705/9 |
| 2008/0189142 A1 * | 8/2008 | Brown et al. | 705/4 |
| 2008/0258890 A1 * | 10/2008 | Follmer et al. | 340/439 |
| 2010/0148947 A1 * | 6/2010 | Morgan et al. | 340/426.22 |
| 2010/0179897 A1 * | 7/2010 | Gafford et al. | 705/35 |
| 2010/0205022 A1 * | 8/2010 | Brown | 705/7 |
| 2011/0130905 A1 * | 6/2011 | Mayer | 701/22 |
| 2011/0178678 A1 * | 7/2011 | Asahara | 701/36 |

OTHER PUBLICATIONS

On Board Communications, FleetTraks Web Application Guide, 2008.*
Pay Technologies, LLC, archives org, May 31, 2009 https://web.archive.org/web/20090531114920/http://www.payteck.cc/aboutpayteck.html https://web.archive.org/web/20081031050548/http://www.payteck.cc/Webteckplusad.pdf.*
On Board Communications, FleetTraks Web Application Guide, 2008 http://www.dtegps.com/2008_Web_Application_User_Guide.pdf.*
On Board Communications, FleetTraks Web Application Guide, 2007 http://www.onboardcommunications.com/2007%20Web%20Application%20User%20Guide.pdf.*
On Board Communications, SafetyTraks Web Application Guide, 2008 http://info.safetytraks.com/safetytraksusersmanual.pdf.*
Asianwolf digital combination keypad starter kill car alarm from asianwolf, Youtube, Apr. 28, 2008 https://www.youtube.com/watch?v=YW9thRHzYyg.*
Pay Technologies, LLC, archives org, May 31, 2009 https://web.archive.org/web/20090531114920/http://www.payteck.cc/aboutpayteck.html.*
Skybitz webpages, service plans, archives-org, 2008 http://www.skybitz.com/solutions/plans.html.*
PCT Notification of Transmittal of the International Search Report and the Written Opinion of the International Searching Authority, or the Declaration with attached International Search Report and the Written Opinion of the International Searching Authority in International Application No. PCT/US2011/037511 dated Jul. 27, 2011, 10 pages.

* cited by examiner

SYSTEM AND METHOD FOR DETERMINING EQUIPMENT UTILIZATION CHANGES BASED ON IGNITION AND MOTION STATUS

TECHNICAL FIELD OF THE INVENTION

The present invention relates generally to the field of resource management and, more particularly, to measuring equipment utilization.

BACKGROUND OF THE INVENTION

When managing the use of equipment, such as vehicles, in certain environments, owners and operators of the equipment may desire to accurately measure, monitor, and predict the utilization of the equipment. Without the ability to precisely measure utilization, equipment may be inefficiently allocated to projects and tasks with equipment sitting idle at one assignment while another assignment is delayed because the equipment is unavailable. Additionally, the costs associated with operating the equipment for specific customers or projects may not be accurately allocated to those customers and projects. Inaccurate measurements of equipment utilization may also increase the difficulty of scheduling equipment maintenance and supply purchases. Furthermore, accurate measures of equipment utilization may facilitate more accurate assessments of employee productivity and value.

SUMMARY OF THE INVENTION

The present invention provides a method and system for determining the utilization of one or more vehicles that substantially eliminates or reduces at least some of the disadvantages and problems associated with previous methods and systems for determining utilization.

In accordance with one embodiment of the present invention, a method for measuring vehicle utilization includes determining, with an ignition sensor, an ignition status of a vehicle and determining, with a motion sensor, a motion status of the vehicle. The method further includes determining a utilization of the vehicle based, at least in part, on the ignition status and the motion status. Additionally, the method includes transmitting status information to a location remote from the vehicle. The status information indicates at least one of the ignition status, the motion status, and the utilization.

In accordance with another embodiment of the present invention, a method for measuring vehicle utilization includes receiving, at a monitoring station, status information indicating an ignition status of a vehicle. The method also includes receiving, at the monitoring station, status information indicating a motion status of the vehicle. Additionally, the method includes determining a utilization of the vehicle, based at least in part on the received ignition status and the received motion status.

Important technical advantages of certain aspects of the present invention include more precisely determining whether a vehicle is being utilized and/or how frequently the vehicle is being utilized. By determining the ignition status and motion status of a vehicle, owners and/or operators of the vehicle may be able to determine when the vehicle is actually performing specific tasks associated with the vehicle. Additionally, owners or operators may be able to remotely determine whether the vehicle is performing designated tasks. Furthermore, in particular embodiments, useful calculations and/or operations may be performed based on generated utilization data. For example, in particular embodiments, utilization data may be used in billing customers, ordering supplies, scheduling maintenance, and evaluating employees. Additionally, particular embodiments facilitate more efficient use of fuel or other supplies by idling vehicles.

Other technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
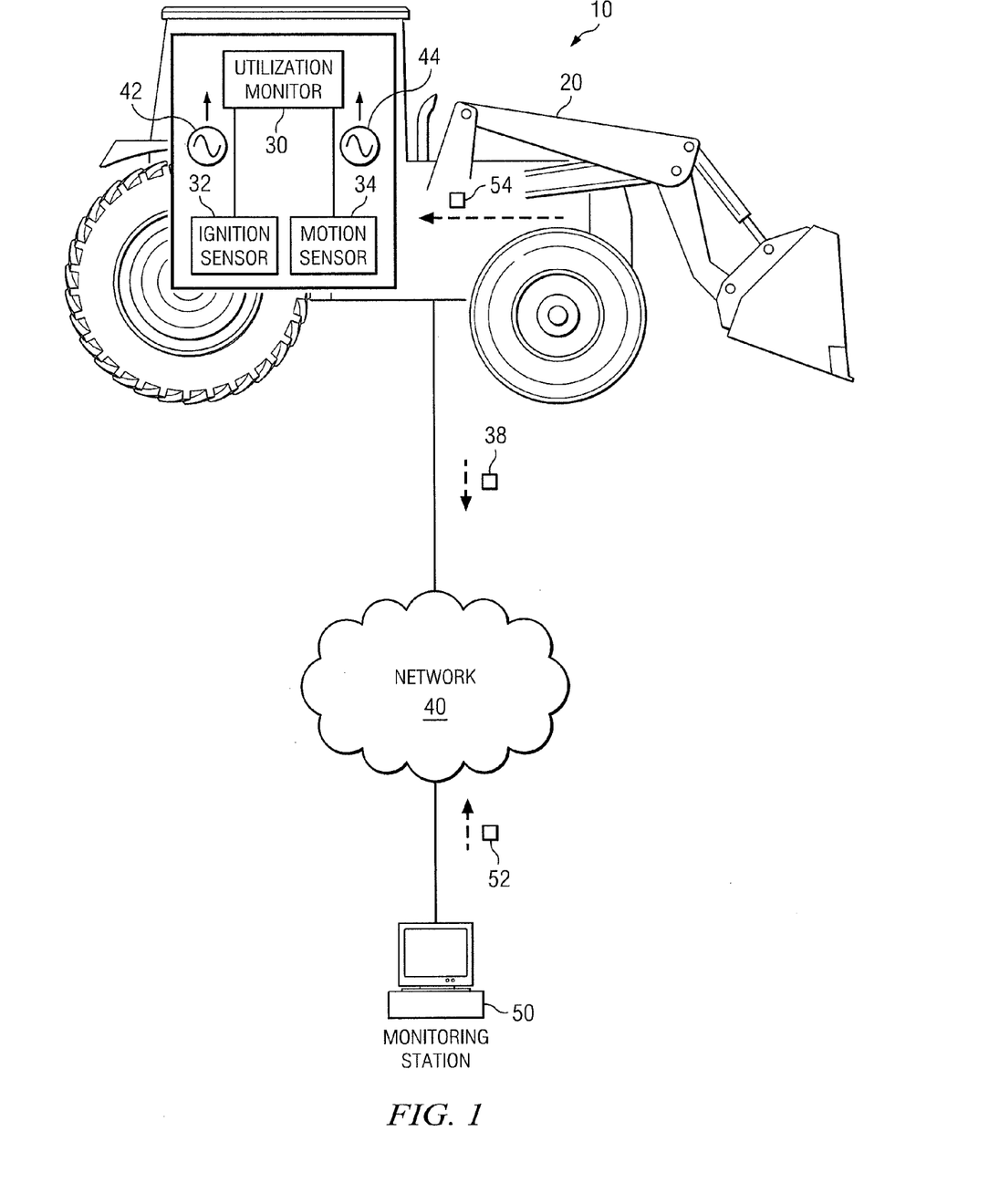
FIG. 1 is a block diagram illustrating a monitoring system that includes a vehicle, a utilization monitor, a network, and a monitoring station.

FIG. 1 illustrates a particular embodiment of a monitoring system 10 for monitoring the utilization of equipment that performs certain tasks within monitoring system 10. The illustrated embodiment of monitoring system 10 includes a vehicle 20, a utilization monitor 30, a network 40, and a monitoring station 50. Utilization monitor 30 detects certain states or characteristics of vehicle 20 and, in particular embodiments, determines a utilization of vehicle 20 based on the detected states or characteristics. Utilization monitor 30 then transmits status information 38 related to the utilization to monitoring station 50, which monitoring station 50 then uses to perform certain calculations and/or operations.

"Utilization" may be a measurement or estimate of when, how frequently, or the total amount of time vehicle 20 is performing certain tasks assigned to vehicle 20 or otherwise engaged in productive activity. In particular embodiments, various embodiments of monitoring system 10 may determine this utilization based on any appropriate combination of states, characteristics, or other considerations of or relating to vehicle 20. By selecting an appropriate combination of factors to consider in determining the utilization, monitoring system 10 may provide improved utilization data.

For example, in particular embodiments of monitoring system 10, utilization is determined based on whether vehicle 20 is both turned on and moving. Determining utilization based solely on whether vehicle 20 is turned on can lead to inaccurate results as a driver may turn an engine of vehicle 20 on and leave the engine running even while vehicle 20 is not engaged in the task associated with vehicle 20. Similarly, determining utilization based solely on whether the vehicle is moving may also produce inaccurate results as movement in vehicle 20 may result from vibrations caused by nearby equipment or from vehicle 20 being towed or otherwise transported. As a result, particular embodiments of monitoring system 10 may provide more accurate utilization determinations based on whether vehicle 20 is both turned on and moving.

In the illustrated embodiment, vehicle 20 represents any vehicle or other equipment that may be used to perform a certain task or tasks or that may itself perform tasks autonomously. Examples of vehicle 20 include, but are not limited to, construction vehicles, such as bulldozers, cranes, dump trucks, forklifts, and back hoes; agricultural vehicles such as harvesters, combines, tractors, ploughs, and tillers; and service vehicles such as tow trucks, fuel trucks, and cherry pickers. Vehicle 20 may also represent equipment such as jack hammers, belt sanders, compactors, or other types of motorized equipment. Although FIG. 1 shows, for purposes of example a single vehicle 20, monitoring system 10 may monitor any appropriate number and type of vehicles 20 and may determine utilizations for individual vehicles 20, groups of vehicles 20, or both. For example, monitoring system 10 may be configured to measure a fleet utilization based on utilizations of multiple different related vehicles 20.

Utilization monitor 30 monitors the operation and/or state of vehicle 20 or components of vehicle 20 for purposes of determining the utilization of vehicle 20. In particular embodiments, utilization monitor 30 may represent electronic and/or mechanical components located on or in vehicle 20. Utilization monitor 30 may include and/or communicate with any appropriate sensors suitable to determine the utilization of vehicle 20. For example, in the illustrated embodiment, utilization monitor 30 includes or is connected to an ignition sensor 32 and a motion sensor 34. Utilization monitor 30 receives data from appropriate sensors and generates status information 38 based on these signals. Utilization monitor 30 then transmits the generated status information 38 to monitoring station 50, directly or over network 40. Utilization monitor 30 may include or represent any appropriate combination of hardware and/or software suitable to provide the described functionality. The contents and operation of a particular embodiment of utilization monitor 30 are described in greater detail below with respect to FIG. 2.

Ignition sensor 32 determines an ignition status of vehicle 20 and communicates this ignition status to utilization monitor 30. The ignition status indicates whether vehicle 20 is in an "on" state or an "off" state. Although described here as having an "ignition" status, vehicle 20 may be powered by internal combustion, a battery, a hybrid internal-combustion/electrical power supply, or any other appropriate form of power supply. Regardless of the type of power supply employed, the ignition status indicates whether vehicle 20 is drawing power from this power supply or otherwise activated.

Ignition sensor 32 may determine the ignition status of vehicle 20 in any appropriate manner depending on the configuration of vehicle 20. For example, in particular embodiments, ignition sensor 32 may represent an electrical sensor connected to the ignition wiring of an internal combustion engine in vehicle 20. When the engine is started and/or running, ignition sensor 32 may receive a signal from the ignition wiring system of vehicle 20 indicating that the engine is in an "on" state. In other embodiments, ignition sensor 32 may be coupled to a mechanical component of an engine of vehicle 20. Thus, ignition sensor 32 may be attached to a transmission, drive train, pulley system, or other mechanical component of an engine of vehicle 20, the engagement, operation, or motion of which signals to ignition sensor 32 that an engine of vehicle 20 is on. In yet other embodiments, the power supply of vehicle 20 may represent an electrical battery and ignition sensor may determine whether vehicle 20 is currently drawing power from the battery. More generally, however, ignition sensor 32 may represent any appropriate combination of hardware, electrical, and/or software components suitable for determining whether a power supply of vehicle 20 is currently providing vehicle 20 power.

Motion sensor 34 detects movement of vehicle 20 or a part, component, or portion of vehicle 20 and communicates a motion status to utilization monitor 30 based on the relevant movement. Motion sensor 34 may include mechanical, electrical, or combined electro-mechanical components that detect vibrations or other indications that vehicle 20 or a particular part or component of vehicle 20 is moving. For example, motion sensor 34 may detect the movement of a bulldozer as a whole, the raising or lowering of a dump truck bed, the rotation of a backhoe bucket, the vibrations of a jackhammer, or any other appropriate type of movement. Motion sensor 34 may be calibrated according to the particular vehicle 20 to which it is coupled and an appropriate sensitivity level may be set. In particular embodiments, motion sensor 34 represents or includes the SQSEN-200 sensor package sold by SignalQuest, Inc. along with any appropriate filtering and control circuits. Although FIG. 1 illustrates for purposes of example a single motion sensor 34, particular embodiments of monitoring system 10 may include any appropriate number of motion sensors 26.

Network 40 represents any form of communication network supporting circuit-switched, packet-based, serial, and/or any other suitable type of communication. Network 40 may represent a communication network supporting wired or wireless communication, or both. Although shown in FIG. 1 as a single element, network 40 may represent one or more separate networks including all or parts of various different networks that are separated and serve different utilization monitors 30 and/or monitoring stations 50. Network 40 may include routers, hubs, switches, gateways, call controllers, wireless receivers and transmitters, antennas, serial cables, Ethernet cables, infrared transmitters and receivers, and/or any other suitable components in any suitable form or arrangement. In general, network 40 may comprise any combination of public or private communication equipment such as elements of the public switched telephone network (PSTN), a global computer network such as the Internet, a local area network (LAN), a wide area network (WAN), or other appropriate communication equipment. For example, in particular embodiments, utilization monitor 30 may be configured to communicate over cellular, Wi-Fi, WiMax, Bluetooth, and/or other readily-available wireless communication networks, allowing utilization monitor 30 to communicate with monitoring station 50 using existing, publicly-accessible communication infrastructure.

Monitoring station 50 represents a location and/or components remote from vehicle 20 where information on the utilization of vehicle 20 can be monitored, processed, or recorded. Monitoring station 50 may represent or include any appropriate components for receiving, processing, storing, or displaying information associated with the utilization of vehicle 20. In particular embodiments, monitoring station 50 may include a wireline or wireless receiver capable of receiving information transmitted to monitoring station 50 by utilization monitor 30, either directly or over network 40. Additionally, monitoring station 50 may include a microprocessor or other processing components to allow monitoring station 50 to calculate the utilization of vehicle 20 or otherwise process status information 38 received from utilization monitor 30. Monitoring station 50 may also include components for generating and displaying reports describing or analyzing the utilization of vehicle 20 such as a printer or computer monitor. Monitoring station 50 may be controlled, entirely or in part, by human operators or may be fully automated. As a result, in particular embodiments, monitoring station 50 may include user interface components suitable to facilitate such operations such as a keyboard, mouse, or other input devices.

Monitoring station 50 may represent a single component, multiple components located at a central location within monitoring system 10, or multiple components distributed throughout monitoring system 10. For example, monitoring station 50 may represent a single computer that receives status information 38 from one or more utilization monitors 30 or a distributed collection of computers that each receive status information 38 from one or more vehicles 20 and that aggregate or combine this utilization information. The components of an example embodiment of monitoring station 50 are described in greater detail below with respect to FIG. 3.

In operation, the illustrated embodiment of monitoring system 10 determines a utilization associated with vehicle 20 and performs calculations and/or operations based on the determined utilization. In particular, utilization monitor 30 receives data from various sensors, such as ignition sensor 32 and motion sensor 34 and transmits status information 38 related to the utilization of vehicle 20 to monitoring station 50. By utilizing both an ignition status determined by ignition sensor 32 and a motion status determined by motion sensor 34, monitoring system 10 may more accurately determine a utilization associated with vehicle 20.

An example of this process, as implemented by a particular embodiment of monitoring system 10, is illustrated in FIG. 1. In the illustrated embodiment, ignition sensor 32 determines an ignition status of vehicle 20. As described above, this ignition status of vehicle 20 indicates whether vehicle 20 or a power supply of vehicle 20 is in an "on" state or an "off" state. Ignition sensor 32 may be configured to determine an ignition status of vehicle 20 at predetermined time intervals, continuously, or in response to an instruction transmitted by monitoring station 50. After determining the ignition status of vehicle 20, ignition sensor 32 communicates the ignition status to utilization monitor 30. Ignition sensor 32 may communicate the ignition status to utilization monitor 30 in any appropriate manner. In the illustrated embodiment, ignition sensor 32 transmits the ignition status to utilization monitor 30 as an electrical signal, shown in FIG. 1 as "ignition signal 42."

Additionally, motion sensor 34 determines a motion status of vehicle 20. As discussed above, the motion status of vehicle 20 may indicate whether vehicle 20 or a particular part of vehicle 20 is moving or performing a particular type of movement. Motion sensor 34 may determine the motion status of vehicle 20 concurrently with or separately from ignition sensor 32 determining the ignition status. As with the ignition status, the motion status of vehicle 20 may be determined at predetermined time intervals, continuously, or in response to an instruction transmitted by monitoring station 50. Motion sensor 34 may then communicate a motion status of vehicle 20 to utilization monitor 30 in any suitable manner. In the illustrated embodiment, motion sensor 34 communicates the determined motion status of vehicle 20 to utilization monitor 30 as an electrical signal, shown in FIG. 1 as "motion signal 44."

Utilization monitor 30 receives the ignition status from ignition sensor 32 (e.g., in the form of ignition signal 42) and the motion status from motion sensor 34 (e.g., in the form of motion signal 44). At appropriate points during operation, utilization monitor 30 generates status information 38 based on the ignition status and the motion status of vehicle 20. Utilization monitor 30 then transmits status information 38 to monitoring station 50, either directly or over network 40. Utilization monitor 30 may transmit status information 38 continuously, or at predetermined time periods, such as the end of a work day or week. In particular embodiments, utilization monitor 30 may transmit status information 38 indicating the ignition status of vehicle 20 and status information 38 indicating the motion status of vehicle 20. In such embodiments, monitoring station 50 may then determine the utilization of vehicle 20 based on this status information 38. Alternatively, in particular embodiments, utilization monitor 30 may itself determine a utilization of vehicle 20 based on the ignition status and motion status of vehicle 20 and transmit status information 38 indicating the utilization to monitoring station 50.

As discussed above, utilization may represent an estimate of the amount of time vehicle 20 is actually engaged in productive activity. Thus, in particular embodiments, utilization may be measured by continuously determining the ignition status and motion status of vehicle 20 and performing a logical combination of these two parameters. For example, in particular embodiments, utilization monitor 30 (or other appropriate components of monitoring system 10) may determine the utilization of vehicle 20 by performing a logical "AND" operation on an ignition signal 42 received from ignition sensor 32 and a motion signal 44 received from motion sensor 34. Determining the utilization of vehicle 20 based on both these factors may provide a more useful and accurate utilization determination.

Monitoring station 50 receives status information 38 from utilization monitor 30. Monitoring station 50 may then store the utilization of vehicle 20, generate reports reporting or analyzing the utilization of vehicle 20, aggregate the utilization of the relevant vehicle 20 and that of other vehicles, perform tasks based on the utilization, or otherwise process or use the utilization in any appropriate manner. Additionally, in embodiments of monitoring system 10 in which utilization monitor 30 does not itself determine the utilization of vehicle 20, monitoring station 50 may also determine the utilization for vehicle 20 based on the received status information 38.

Additionally, in particular embodiments, monitoring station 50 may receive status information 38 from multiple different vehicles 20 and may sum, average, or otherwise aggregate the utilization data from multiple vehicles 20. For example, a monitoring station 50 may receive status information 38 from multiple different vehicles 20, generate a utilization for each, and then aggregate utilization data for all vehicles 20, a particular type or fleet of vehicles 20, vehicles 20 associated with a particular project or worksite, or any other appropriate subset of vehicles 20.

After receiving or generating a utilization for vehicle 20, monitoring station 50 may perform one or more calculations or operations with respect to the determined utilization and/or the corresponding vehicle 20. Monitoring station 50 may also save the utilization or incorporate the utilization into historical utilization data. In particular embodiments, monitoring station 50 may combine, average, or otherwise aggregate utilization data associated with a particular vehicle 20 with previously-generated utilization data for that same vehicle 20. In general, however, monitoring station 50 may use the utilization of vehicle 20 in any appropriate manner depending on the configuration of monitoring system 10.

As one example, monitoring station 50 may estimate a level of supplies required for vehicle 20 based on its utilization. If a particular vehicle 20 requires a certain amount of water or fuel per hour of work performing tasks associated with that vehicle 20, monitoring station 50 may determine, based on the utilization of vehicle 20, that more water or fuel is needed or that more water or fuel will be required at a particular point in the future. An operator of monitoring station 50 may then order or otherwise provision supplies for vehicle 20. Thus, in particular embodiments, monitoring station may determine, based on the utilization of vehicle 20, a supply status for vehicle 20 that represents an estimate of the amount of a particular supply vehicle 20 has remaining, an estimate of when more supplies should be ordered, an estimate of when vehicle 20 will deplete its allotment of the relevant supply, or any other appropriate status associated with a supply or supplies used by vehicle 20. Additionally, based on this supply status, monitoring station 50 may generate an order to purchase more supplies, allocate more supplies to vehicle 20 from a common stock, and/or take other appropriate actions.

As another example, monitoring station 50 may determine, based on the utilization of vehicle 20, a maintenance status for vehicle 20 that represents a target date for a particular type of maintenance, an estimate of how much more vehicle 20 can be utilized before needing maintenance, or any other appropriate parameter or metric associated with maintenance of vehicle 20. For instance, if vehicle 20 requires an oil change every 100 hours of utilization, monitoring station 50 may calculate an appropriate date for the oil change. Additionally, based on this maintenance status, monitoring station 50 may, in particular embodiments, generate a maintenance ticket for vehicle 20, transmit a service request to a maintenance provider, generate a calendar entry for performing maintenance, and/or take other appropriate actions.

As another example, monitoring station 50 may calculate a billing amount for vehicle 20 based on the determined utilization of vehicle 20. Calculating a billing amount based on the determined utilization may allow a user of monitoring system 10 to more accurately bill for expenses associated with operating vehicle 20. In circumstances in which a particular vehicle 20 is used by more than one party or used in projects associated with more than one party, the measured utilization may be used to determine a billing amount for each party that uses the vehicle 20 or has work performed by the vehicle. For example, vehicle 20 may be in the possession of a first party for the first half of a day, but the utilization is determined to be only one hour. Vehicle 20 may be in the possession of a second party for the second half of a day, and the utilization is determined to be four hours. Using the utilization, rather than the number of hours the vehicle was in possession of each party, enables an owner of vehicle 20 to more precisely determine and allocate a billing amount among multiple parties.

Thus, to facilitate more accurate billing practices, in particular embodiments, monitoring station 50 may receive status information 38 indicating a first utilization associated with a first time. Monitoring station 50 may later receive status information 38 associated with a second time. Monitoring station 50 may then calculate a first billing amount for a first customer associated with work done at or during the first time based on the first utilization and a second billing amount for a second customer associated with work done at or during the second time based on the second utilization. As a result, multiple parties can use or have work performed by a particular vehicle and be billed based on an accurate amount of how much the vehicle was utilized during the period the vehicle was allocated to each of the parties.

As yet another example, monitoring station 50 may calculate a bid amount for a project that will use vehicle 20 based on the determined utilization of vehicle 20, historical utilization data associated with vehicle 20, or historical utilization data associated with several vehicles 20. Using more accurate historical utilization data may allow users of monitoring system 10 to more accurately calculate the cost associated with operating vehicle 20. This may in turn allow monitoring station 50 to generate more accurate bids for projects involving vehicle 20. Thus, in particular embodiments, an operator of monitoring station 50 may enter parameters for a project to be bid and monitoring station 50 may generate a bid amount based in part on historical utilization data for one or more vehicles 20. Additionally, based on this bid amount, monitoring station 50 may generate a bid proposal for the project that incorporates the bid amount, indicate to the operator that an entered amount is too low of a bid, and/or take other appropriate actions.

As yet another example, monitoring station 50 may calculate an employee payment amount for an employee or contractor associated with vehicle 20 (e.g., the vehicle's driver or operator). For instance, a particular user of vehicle 20 may be an employee who is paid a bonus based on maximizing his or her utilization of a particular vehicle 20 or an overtime wage if his or her utilization exceeds a predetermined level. As a result, monitoring station 50 may calculate a payment amount that reflects a salary, an hourly wage, or a bonus to be paid to an employee associated with vehicle 20. This payment amount may be used in paying a current employee or in making hiring decisions for future employees, such as by estimating a salary for the operator of vehicle 20. Additionally, based on this payment amount, monitoring station 50 may, in particular embodiments, generate a paycheck and/or take other appropriate actions.

Additionally, monitoring station 50 may perform certain operations involving vehicle 20 based on the receive status information 38. For example, if monitoring station 50 receives status information 38 indicating that an engine of vehicle 20 is in an "on" state and indicating that vehicle 20 is not moving, then monitoring station 50 (or an operator of monitoring station 50) may determine that the vehicle 20 is idling. As a result, monitoring station 50 may transmit a kill request 52 that requests vehicle 20 to turn its engine off. Kill request 52 may represent a packet, message, file, signal, and/or information formatted in any other appropriate manner that instructs vehicle 20 to turn its engine off, deactivate its battery, or otherwise change its ignition status. For example, in response to receiving status information 38 indicating that an engine of vehicle 20 is on and vehicle 20 is not moving, monitoring station 50 may indicate to an operator of monitoring station 50 (e.g., by activating a light or displaying a message on a monitor) that vehicle 20 is idling. The operator may then indicate to monitoring station 50 (e.g., by pressing a designated button or entering appropriate commands) that the engine of the relevant vehicle should be terminated. Monitoring station 50 may then transmit a kill request 52 to utilization monitor 30 of the relevant vehicle 20. Alternatively, monitoring station 50 may be configured to generate and transmit, without user or operator input, kill request 52 if a predetermined threshold is met, such as vehicle 20 remaining in an "idle" state for longer than a predetermined length of time or vehicle 20 entering a predetermined number of "idle" states within a predetermined time period.

Utilization monitor 30 may then receive kill request 52 from monitoring station 50. In response to kill request 52, utilization monitor 30 may turn vehicle 20 off, otherwise terminate use of the relevant vehicle's engine or power supply, and/or otherwise change the ignition status of vehicle 20. In particular embodiments, utilization monitor 30 may change the ignition status of vehicle 20 immediately, or after a predetermined time-delay after giving an appropriate warning indicator (such as an audible alarm, a flashing visual indicator, or a series of vibrations) to an operator of vehicle 20.

In particular embodiments, utilization monitor 30 may also be capable of receiving override requests 54 from an operator of vehicle 20 and/or monitoring station 50 that instructs utilization monitor 30 to abort the requested change. Override request 54 may be received from a user or operator manually pressing a switch or button on utilization monitor 30, or may be received from monitoring station 50 via network 40. In response to receiving override request 54, utilization monitor 30 may disregard kill request 52 and consequently maintain the prior ignition status of vehicle 20. This may prevent vehicle 20 from being disabled in dangerous situations or when the operator of vehicle 20 will soon resume use of vehicle 20.

Thus, by measuring utilization of vehicle 20 based on whether vehicle 20 is both in an "on" state and moving, an utilization monitoring system 10 may more accurately and precisely manage vehicle 20 in several respects. By allowing monitoring station 50 to remotely change the ignition status of vehicle 20, monitoring system 10 enables an owner or operator to preserve or maintain supplies used by vehicle 20 (such as fuel, electricity, batteries, or water) for use when vehicle 20 is actually operating. In particular embodiments, utilization monitor may also be configured to allow an operator to override the instruction to change the ignition status, thereby giving on-site users control over the ignition status of vehicle 20 to improve safety and productivity. As a result, monitoring system 10 may provide numerous operational benefits. Nonetheless, particular embodiments may provide some, none, or all of these operational benefits.

Figure 2:
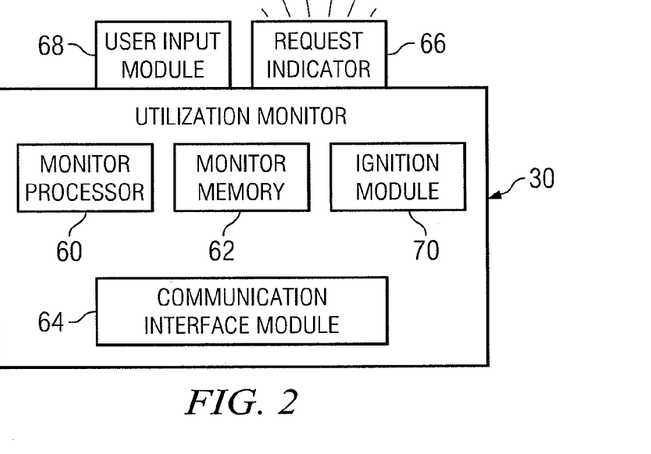
FIG. 2 is a block diagram illustrating in more detail a particular embodiment of the utilization monitor shown in FIG. 1.

FIG. 2 is a block diagram illustrating in greater detail the contents and operation of a particular embodiment of utilization monitor 30 shown in FIG. 1. As discussed above with respect to FIG. 1, utilization monitor 30 receives an indication of the ignition status and motion status of vehicle 20 and communicates status information 38 to monitoring station 50. Utilization monitor 30 may represent a single component or multiple components. In the illustrated embodiment, utilization monitor 30 includes a monitor processor 60, a monitor memory 62, a communication interface module 64, a request indicator 66, a user input module 68, and an ignition module 70.

Monitor processor 60 may represent or include any form of processing component, including general purpose computers, dedicated microprocessors, or other processing devices capable of processing electronic information. With respect to utilization monitor 30, monitor processor 60 data about vehicle 20 from one or more sensors (such as ignition sensor 32 and motion sensor 34 of FIG. 1) and based on this data generate status information 38 to transmit to monitoring station 50. Additionally, monitor processor 60 may be capable of instructing ignition module 70 to change the ignition status of vehicle 20. Examples of monitor processor 60 include digital signal processors (DSPs), application-specific integrated circuits (ASICs), field-programmable gate arrays (FPGAs), and any other suitable specific or general purpose processors. Although FIG. 2 illustrates a particular embodiment of utilization monitor 30 that includes a single monitor processor 60, utilization monitor 30 may, in general, include any suitable number of monitor processors 60.

Monitor memory 62 stores processor instructions for monitor processor 60 and/or other values or parameters that utilization monitor 30 utilizes during operation. In particular embodiments, monitor memory 62 may store utilization data for vehicle 20 for subsequent retrieval and/or analysis by monitoring station 50 or other elements of monitoring system 10. Monitor memory 62 may comprise any collection and arrangement of volatile or non-volatile components suitable for storing data. For example, monitor memory 62 may comprise random access memory (RAM) devices, read-only memory (ROM) devices, magnetic storage devices, optical storage devices, non-volatile flash memory, or any other suitable data storage devices. In particular embodiments, monitor memory 62 may represent, in part, computer-readable storage media on which computer instructions and/or logic are encoded. In such embodiments, some or all the described functionality of utilization monitor 30 may be provided by monitor processor 60 executing the instructions encoded on the described media. Although shown in FIG. 2 as a single component, monitor memory 62 may represent any number of memory elements within, local to, or accessible by utilization monitor 30. Additionally, although shown in FIG. 2 as being located internal to utilization monitor 30, monitor memory 62 may represent storage components remote from utilization monitor 30.

Communication interface module 64 facilitates transmission of status information 38 to monitoring station 50, directly or over network 40. In particular embodiments, communication interface module 64 is capable of transmitting status information 38 wirelessly. As a result, in particular embodiments, communication interface module 64 may represent or include an antenna, electronic transceiver, and other appropriate components to facilitate wireless communication over a cellular, Bluetooth, Wi-Fi, or other type of wireless network. As a result, in particular embodiments, utilization monitor 30 may be able to transmit status information 38 to monitoring station 50 as simple radio-frequency signals, as part of a voice telephone call (e.g., as tones or synthesized speech), in a series of Internet Protocol (IP) packets, as an email, or in any other appropriate manner. Alternatively, if vehicle 20 maintains a fixed connection with some component of monitoring system 10, such as tracks or rails, communication interface module 64 may transmit status information 38 to monitoring station 50 over a wired connection. In particular embodiments, communication interface module 64 may support two-way communication with monitoring station 50 or other components of monitoring system 10. For example, utilization monitor 30 may receive kill request 52 from monitoring station 50 through communication interface module 64.

Request indicator 66 warns an operator of vehicle 20 that utilization monitor 30 has received a kill request 52 from monitoring station 50, which may allow the operator to generate override request 54 before the ignition module 70 changes the ignition status of vehicle 20. Request indicator 66 may represent or include any appropriate components for indicating to the operator that a kill request 52 has been received, such as a flashing LED, a computer monitor, a tone generator, or a vibrating device. In general, request indicator 66 is any appropriate combination of hardware and/or software suitable to warn an operator of vehicle 20 of an impending change in the ignition status of vehicle 20.

User input module 68 receives input from a user or operator of vehicle 20 to disregard an attempted change in the ignition status of vehicle 20. User input module 68 may represent or include a button, switch, level, knob, keyboard, or any other input mechanism suitable to perform the described functions. Based on input received from user input module 68, user input module 68 may transmit override request 54 to monitor processor 60. Monitor processor 60 may further transmit override requests 54, which instructs ignition module 70 to disregard the received kill request 52.

Ignition module 70 may be configured to change the ignition status of vehicle 20. In particular embodiments, ignition module 70 may be connected to the electrical, fuel, battery, or ignition system of vehicle 20 and capable of altering a state of the relevant system. For example, ignition module 70 may be capable of opening a circuit between a battery and an electric motor of vehicle 20, thereby disrupting the flow of electricity to the electric motor. As another example, ignition module 70 may be capable of stopping the flow of fuel to an internal combustion engine of a particular vehicle 20, thereby stopping the motor. In general, ignition module 70 may be any combination of mechanical and/or electrical components, hardware and/or software suitable to perform the described functions.

Figure 3:
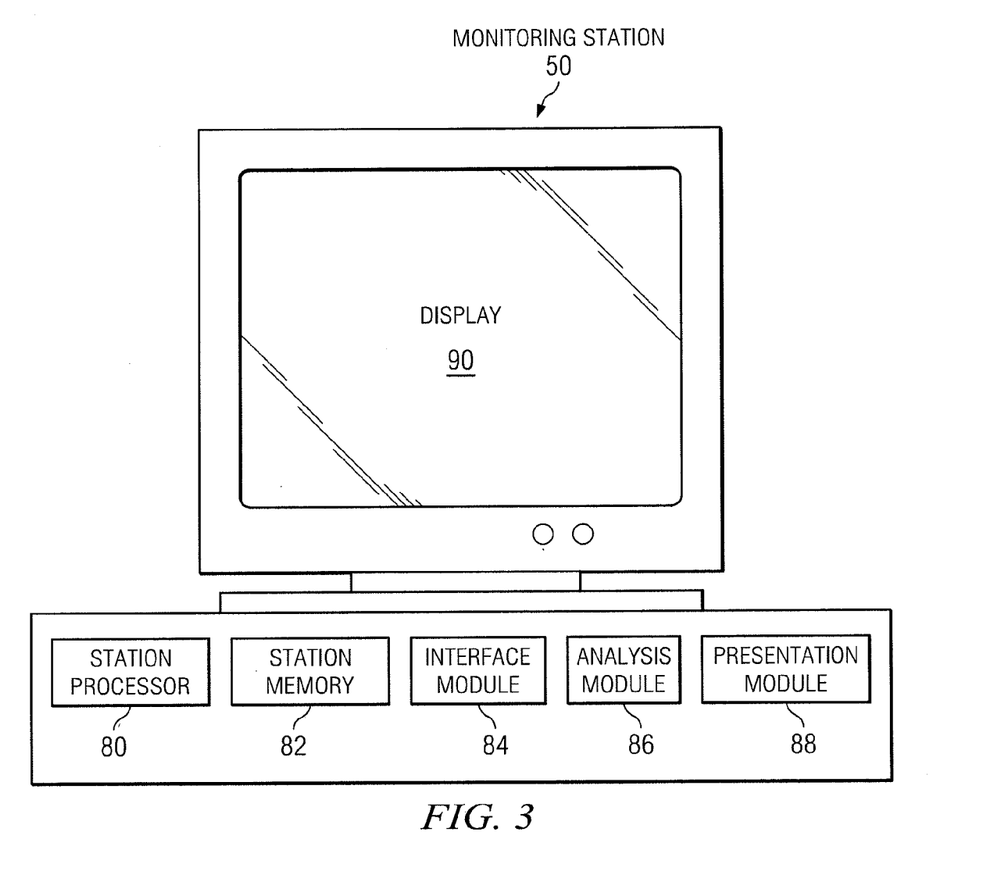
FIG. 3 is a block diagram illustrating in more detail a particular embodiment of the monitoring station shown in FIG. 1.

FIG. 3 is a block diagram illustrating in greater detail the components and operation of a particular embodiment of monitoring station 50 shown in FIG. 1. In general, monitoring station 50 receives status information 38 from utilization monitor 30 and uses a utilization included in or generated from status information 38 to provide certain functionality. Monitoring station 50 may additionally store the utilization for later retrieval to facilitate analysis of historical utilization data. As shown in FIG. 3, a particular embodiment of monitoring station 50 may include a station processor 80, a station memory 82, an interface module 84, an analysis module 86, a presentation module 88, and a display 90.

Station processor 80 may represent or include any form of processing component, including general purpose computers, dedicated microprocessors, or other processing devices capable of processing electronic information. Examples of processor 70 include digital signal processors (DSPs), application-specific integrated circuits (ASICs), field-programmable gate arrays (FPGAs), and any other suitable specific or general purpose processors. Although FIG. 3 illustrates a particular embodiment of monitoring station 50 that includes a single station processor 80, monitoring station 50 may, in general, include any suitable number of station processors 80. In particular embodiments, station processor 80 may generate a utilization for a particular vehicle 20, may generate a fleet utilization for one or more vehicles 20, and may perform calculations related to the analysis of the generated utilization associated with the one or more relevant vehicles 20. Additionally, station processor 80 may generate and transmit kill request 52 to utilization monitor 30.

Station memory 82 stores processor instructions, historical utilization data, and/or other values or parameters that monitoring station 50 utilizes during operation. Station memory 82 may comprise any collection and arrangement of volatile or non-volatile components suitable for storing data. For example, station memory 82 may comprise random access memory (RAM) devices, read-only memory (ROM) devices, magnetic storage devices, optical storage devices, a database, or any other suitable data storage devices. In particular embodiments, station memory 82 may represent, in part, computer-readable storage media on which computer instructions and/or logic are encoded. In such embodiments, some or all the described functionality of monitoring station 50 may be provided by station processor 80 executing instructions encoded on the described media. Although shown in FIG. 3 as a single component, station memory 82 may represent any number of memory elements within, local to, or accessible by monitoring station 50.

Interface module 84 facilitates communication between monitoring station 50 and utilization monitor 30 or other appropriate components of monitoring system 10. For example, monitoring station 50 may receive status information 38 from utilization monitor 30 through interface module 84, or may transmit kill request 52 to utilization monitor 30 through interface module 84. In particular embodiments, interface module 84 may include or represent Network Interface Cards (NICs) suitable for communication over particular types of network 40, such as an Internet Protocol (IP) network. Alternatively, interface module may represent or include a modem or modems capable of communication over a telecommunications network. Additionally, although FIG. 3 illustrates a particular embodiment of monitoring station 50 that includes a single interface module 84, monitoring station 50 may, in general, include any suitable number of interface modules 84. For example, monitoring station 50 may include an interface module 84 for each utilization monitor 30 that communicates with monitoring station 50.

Analysis module 86 performs one or more calculations related to utilization of vehicle 20. As discussed above, monitoring station 50 may perform one or more calculations based on a received or generated utilization of vehicle 20, such as determining supply levels, maintenance schedules, and billing charges. In particular embodiments, analysis module 86 may represent software performing calculations and/or operations by executing on station processor 80. Additionally, analysis module may be in communication with station memory 82 to facilitate compilation and analysis of historical utilization data.

Presentation module 88 prepares information and analysis pertaining to the utilization of vehicle 20 for presentation to an operator of monitoring station 50 and/or other users of monitoring system 10. Presentation module 88 may generate reports, charts, graphs, web pages, and other materials for display by display 90. These reports may show utilization, maintenance schedules, employee productivity, or other appropriate data for vehicles 20 monitored by monitoring system 10. Additionally, presentation module 88 may incorporate or interface with a printer or other suitable device to allow presentation module 88 to create purchase orders, paychecks, bid proposals, printed reports, and other documents based on utilization data and associated analysis. Furthermore, in particular embodiments, monitoring station 50 may be capable of distributing utilization data or materials created based on such data or notifying appropriate individuals about situations or events related to utilization of vehicles 20. As a result, in particular embodiments, presentation module 88 may incorporate or interface with a communication system such as an email server capable of distributing information relating to the utilization of vehicles 20. As one example, presentation module 88 may be capable of emailing to a particular distribution list a weekly report showing utilization of all vehicles 20 owned by the company. As another example, presentation module 88 may be capable of paging a designated individual whenever a kill request 52 is transmitted to a vehicle 20.

In general, interface module 84, analysis module 86, and presentation module 88 may each represent any appropriate combination of hardware and/or software suitable to provide the described functionality, including logic encoded on tangible media and executed on station processor 80. Additionally, interface module 84, analysis module 86, and presentation module 88 may represent or include common elements. In particular embodiments, interface module 84 and analysis module 86 may represent, in whole or in part, software processes being executed by station processor 80.

Display 90 represents any suitable for component or device for presenting information to an operator of monitoring station 50. Depending on the particular embodiment of monitoring station 50, display 90 may display the utilization of one or more vehicles 20 monitored by monitoring system 10, analysis of utilization data, reports relating to utilization, and/or any other appropriate information associated with utilization of vehicles 20. Examples of display 90 include, but are not limited to, a computer monitor, a dedicated liquid crystal display (LCD), and indicator lights.

Figure 4:
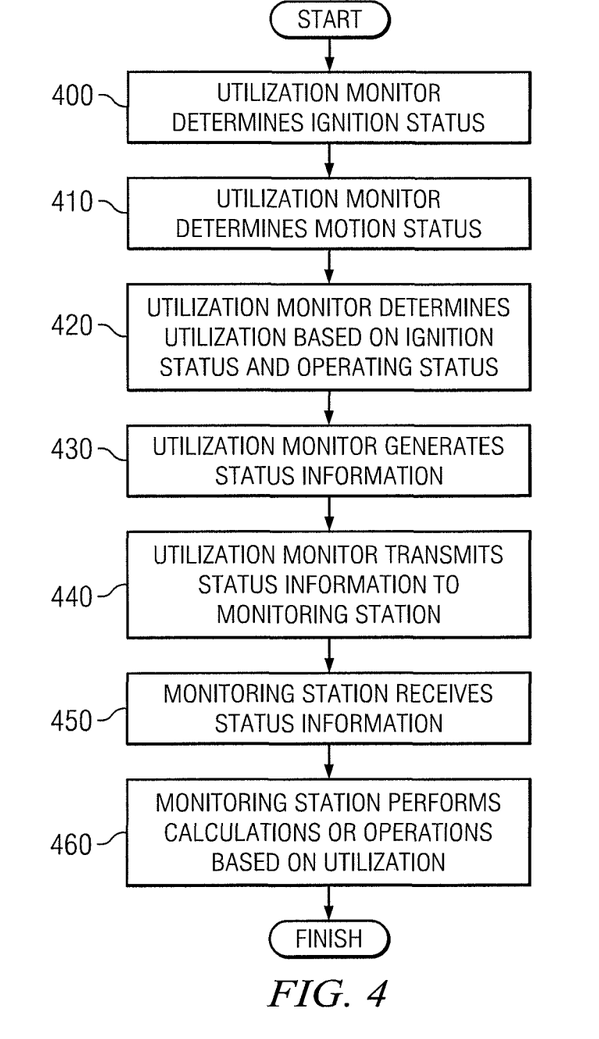
FIG. 4 is a flow chart illustrating example operation of a particular embodiment of the monitoring system in determining a utilization of a vehicle.

FIG. 4 is a flowchart illustrating example operation of a particular embodiment of monitoring system 10 in generating and analyzing a utilization of vehicle 20. The steps illustrated in FIG. 4 may be combined, modified, or deleted where appropriate, and additional steps may also be added to those shown. Additionally, the steps may be performed in any suitable order.

Operation, in the illustrated example, begins at step 400 with utilization monitor 30 determining an ignition status of vehicle 20. As discussed above, the ignition status of vehicle 20 may indicate whether vehicle 20 is currently depleting its supply of fuel, battery power, or another energy resource. Utilization monitor 30 may determine the ignition status of vehicle 20 in appropriate manner, including, but not limited to, using ignition sensor 32. Utilization monitor 30 may be configured to determine an ignition status of vehicle 20 at predetermined time intervals, continuously, or in response to an instruction transmitted by monitoring station 50.

At step 410, utilization monitor 30 determines a motion status of vehicle 20. As discussed above, the motion status of vehicle 20 may indicate whether vehicle 20 is currently moving. Utilization monitor 30 may determine the motion status of vehicle 20 in any appropriate manner, including, but not limited to, using motion sensor 34. Additionally, utilization monitor 30 may determine the motion status of vehicle 20 at predetermined time intervals, continuously, or in response to an instruction transmitted by monitoring station 50.

At step 420, utilization monitor 30 determines a utilization of vehicle 20, based on the determined ignition status and the determined motion status. In particular embodiments, ignition status and/or motion status may each be continuously determined. Accordingly, utilization of vehicle 20 may be measured continuously as the operation illustrated in FIG. 4 repeats. Thus, utilization may measure the length of time for which vehicle 20 is actually performing operations. As noted above, in alternative embodiments, utilization monitor 30 may not determine the utilization of vehicle 20, but may instead transmit status information 38 indicating the ignition status, motion status, and/or other information relevant to utilization to monitoring station 50. Monitoring station 50 may then determine the utilization of vehicle 20 itself.

At step 430, utilization monitor 30 generates status information 38 for vehicle 20 based on information received from sensors 32 and 34. In particular embodiments, status information 38 includes information indicating the utilization of vehicle 20 determined by utilization monitor 30. In alternative embodiments, status information 38 may include sufficient information for monitoring station 50 to determine the utilization of vehicle 20. At step 440, utilization monitor 30 transmits status information 38 to monitoring station 50.

At step 450, monitoring station 50 receives status information 38. As discussed above, monitoring station 50 may receive status information 38 in periodic increments, or continuously as the operation illustrated in FIG. 4 repeats. At step 460, monitoring station 50 performs certain calculations or operations based on the utilization of vehicle 20 such as determining a supply status or maintenance status of vehicle 20, calculating a billing amount for projects involving vehicle 20, and determining a payment amount for employees associated with vehicle 20. Operation with respect to monitoring the utilization of vehicle 20 may then end as shown in FIG. 4.

Figure 5:
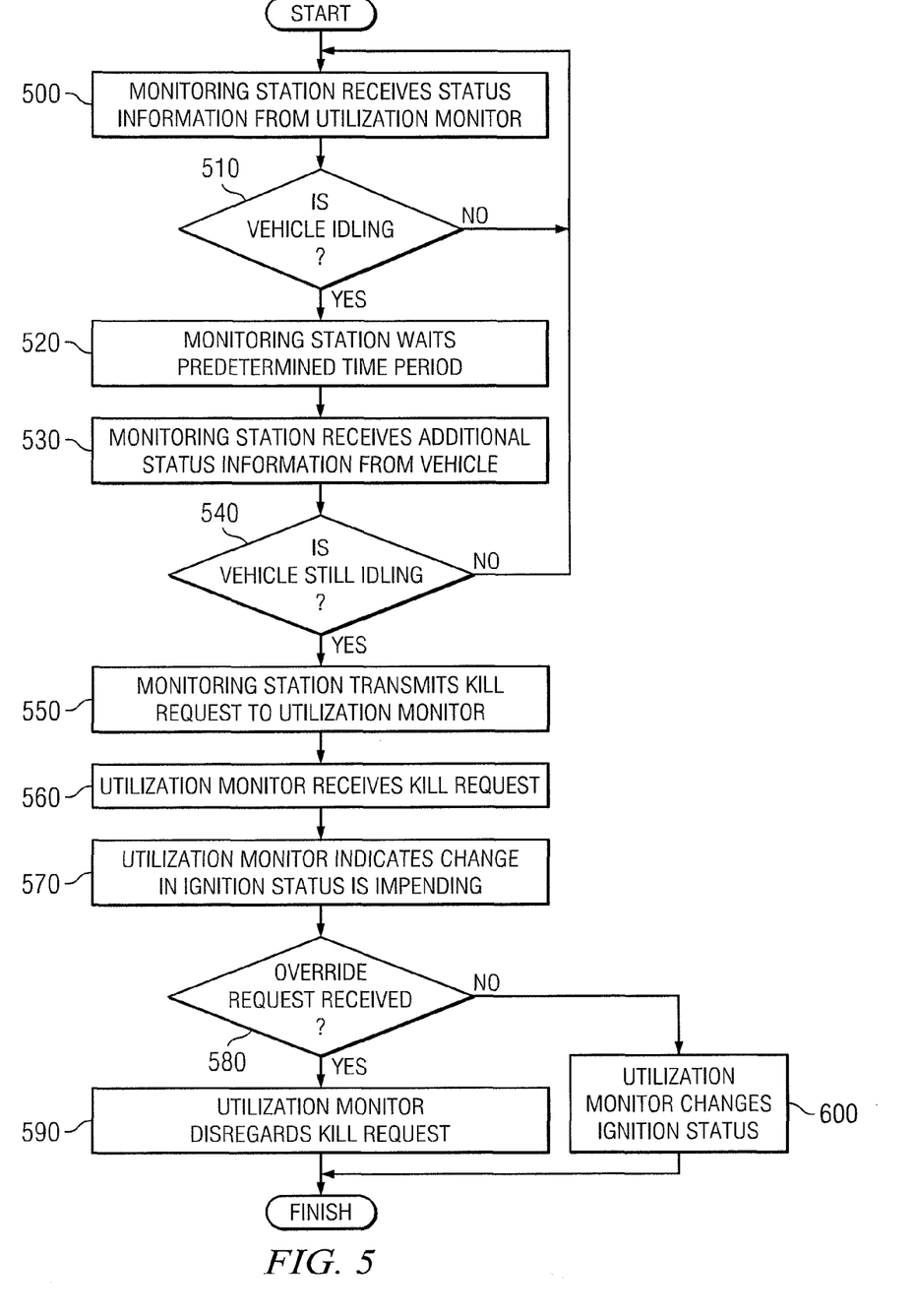
FIG. 5 is a flow chart illustrating example operation of a particular embodiment of the monitoring system in changing an ignition status of a vehicle.

FIG. 5 is a flowchart illustrating example operation of a particular embodiment of monitoring system 10 in which monitoring station 50 attempts to change the ignition status of vehicle 20. As discussed above, to prevent vehicle 20 from needlessly idling, an operator of monitoring station 50 may wish to change the ignition status of a particular vehicle 20 in situations in which the ignition status is in an "on" state and vehicle 20 is not moving. The steps illustrated in FIG. 5 may be combined, modified, or deleted where appropriate, and additional steps may also be added to those shown. Additionally, the steps may be performed in any suitable order.

In the described embodiment, operation begins in step 500 with monitoring station 50 receiving status information 38 from utilization monitor 30. Monitoring station 50 determines, based on status information 38, whether vehicle 20 is idling at step 510. In particular embodiments, monitoring station 50 determines that vehicle 20 is idling when monitoring station 50 receives status information 38 indicating that vehicle 20 is turned on but not moving. If monitoring station 50 determines vehicle 20 is not idling, monitoring station 50 may wait for additional status information 38 and operation may return to step 500.

At step 520, monitoring station 50 may wait a predetermined time period before generating kill request 52. Waiting a predetermined time period may allow for temporary "idle" states of vehicle 20. The precise length of the time period for which monitoring station 50 waits may depend on the overall configuration of monitoring system 10 and, in particular embodiments, may vary based on the circumstances under which a particular vehicle 20 is operating.

After the wait period (if any) elapses, monitoring station 50 may receive additional status information 38 from vehicle 20 at step 530. Monitoring station 50 may then determine, at step 540, whether the additional status information 38 indicates that vehicle 20 is no longer idling. If monitoring station determines vehicle 20 is no longer idling, operation may return to step 500 with monitoring station 50 waiting for further status information 38 from vehicle 20.

If instead monitoring station 50 determines that vehicle 20 is still idling, monitoring station 50 generates kill request 52 and transmits kill request 52 to utilization monitor 30 at step 550. As discussed above with respect to FIG. 1, kill request 52 may include information requesting that utilization monitor 30 change the ignition status of vehicle 20. At step 560, utilization monitor 30 receives kill request 52. At step 570, utilization monitor 30 indicates to an operator of vehicle 20 that a change in the ignition status of vehicle 20 is impending. As discussed above with respect to FIG. 2, utilization monitor 30 may include a request indicator 66 having a flashing LED, a tone generator, a vibration device, or any combination thereof. Thus, in step 570, utilization monitor 30 may flash a warning light, generate an audio tone, trigger a vibration element, and/or otherwise activate components to alert an operator of an impending change in the ignition status of vehicle 20.

At step 580, utilization monitor 30 determines whether it has received an override request 54 from an operator of vehicle 20. For example, the operator of vehicle 20 may leave an engine of vehicle 20 on for a period of time while waiting for tasks to be completed by other equipment and may intend to resume activities as soon as the relevant tasks are completed. When utilization monitor 30 generates a warning, the operator of vehicle 20 may choose not to allow a change in the ignition status of vehicle 20 and may communicate an override request 54 to utilization monitor 30. Thus, if utilization monitor 30 has received an override request 54, operation proceeds to step 590. Otherwise, operation proceeds to step 600.

At step 590, utilization monitor 30 disregards kill request 52. In particular embodiments, step 590 may include transmitting an instruction to ignition module 70 to disregard a previously transmitted instruction to change the ignition status of vehicle 20. Consequently, the ignition status of vehicle 20 remains in an "on" state.

At step 600, if utilization monitor did not receive an override request 54, utilization monitor 30 changes the ignition status of vehicle 20. As discussed above with respect to FIG. 2, in particular embodiments, ignition module 70 may be connected to the electrical, fuel, battery, or ignition system of vehicle 20. Thus, ignition module 70 may be capable of altering a state within the relevant system of vehicle 20, such as disrupting the flow of current between a battery and an electric motor of vehicle 20, simulating a signal to turn off an engine of vehicle 20, disrupting the flow of fuel to an internal combustion engine of vehicle 20, or otherwise changing the ignition status of vehicle 20 in any suitable manner. Operation of monitoring system 10 with respect to changing the ignition status of vehicle 20 may then end as shown in FIG. 5.

Although the present invention has been described in connection with server embodiments, it should be understood that a plenitude of changes, substitutions, variations, alterations, transformations, and modifications may be suggested to one of skill in the art, and it is intended that the present invention encompass such changes, substitutions, variations, alterations, transformations, and modifications as fall within the spirit and scope of the appended claims.

What is claimed is:

1. A computer implemented method for determining a utilization of a vehicle by monitoring both an ignition status and a motion status of the vehicle, the method comprising:
   determining, by an ignition sensor coupled to the vehicle, an ignition status of a power supply of an engine of the vehicle;
   determining, by a motion sensor coupled to the vehicle, a motion status of the vehicle, the motion sensor calibrated according to a predetermined sensitivity level and the motion status determined based on at least a movement of the vehicle;
   transmitting, by one or more processors of the vehicle, the ignition status and the motion status from the vehicle to a monitoring station remotely located from the vehicle, wherein the ignition status indicates that the engine of the vehicle has been on for a first predetermined amount of time and the motion status indicates that the vehicle has not been moving for a second predetermined amount of time;
   receiving, by the one or more processors of the vehicle, a request to change the ignition status of the vehicle from on to off when the ignition status received by the monitoring station indicates that the engine of the vehicle has been depleting the power supply for a first predetermined amount of time and the motion status received by the monitoring station indicates that the vehicle has not been moving for a second predetermined amount of time;
   providing, by the one or more processors of the vehicle, an indication that the change request of the ignition status has been received during a third predetermined amount of time;
   determining whether an override of the change request has been received at the vehicle during the third predetermined amount of time;
   changing, by the one or more processors of the vehicle, the ignition status of the vehicle from on to off after the third predetermined amount of time has elapsed in response to the change request, unless the override has been received during the third predetermined amount of time;
   determining the utilization of the vehicle based on the received ignition status, the received motion status, and the change in the ignition status over time; and
   determining, based on the utilization, a maintenance schedule for the vehicle.

2. The method of claim 1, wherein the motion status is further determined based on vibrations of the vehicle.

3. The method of claim 1, further comprising:
   transmitting, to the monitoring station the determined utilization.

4. The method of claim 1, wherein the motion status is further determined based on detected movements of parts of the vehicle.

5. The method of claim 1, further comprising: determining, based on the utilization, an amount of water or fuel consumed by the vehicle.

6. The method of claim 1, further comprising: determining, based on the utilization, a billing amount for the utilization.

7. A system for determining a utilization of a vehicle by monitoring both an ignition status and a motion status of the vehicle, the system comprising one or more processors configured to:
   determine an ignition status of a power supply of an engine of the vehicle based at least on an ignition sensor coupled to the vehicle,
   determine a motion status of the vehicle based at least on a motion sensor coupled to the vehicle, the motion sensor calibrated according to a predetermined sensitivity level and the motion status determined based on at least a movement of the vehicle;
   transmit, the ignition status and the motion status from the vehicle to a monitoring station remotely located from the vehicle, wherein the ignition status indicates that the engine of the vehicle has been on for a first predetermined amount of time and the motion status indicates that the vehicle has not been moving for a second predetermined amount of time;
   receive a request to change the ignition status of the vehicle from on to off when the ignition status received by the monitoring station indicates that the engine of the vehicle has been depleting the power supply for a first predetermined amount of time and the motion status received by the monitoring station indicates that the vehicle has not been moving for a second predetermined amount of time;
   provide an indication that the change request of the ignition status has been received during a third predetermined amount of time;
   determine whether an override of the change request has been received at the vehicle during the third predetermined amount of time;
   change the ignition status of the vehicle from on to off after the third predetermined amount of time has elapsed in response to the change request, unless the override has been received during the third predetermined amount of time;
   determine the utilization of the vehicle based on the received ignition status, the received motion status, and the change in the ignition status over time; and
   determine, based on the utilization, a maintenance schedule for the vehicle.

8. The system of claim 7 wherein the one or more processors are further configured to determine the motion status of the vehicle based on vibrations of the vehicle.

9. The system of claim 7 wherein the one or more processors are further configured to transmit to the monitoring station the determined utilization.

10. The system of claim 7, wherein the one or more processors are further configured to determine the motion status of the vehicle based on detected movements of parts of the vehicle.

11. The system of claim 7, wherein the one or more processors are further configured to determine, based on the utilization, an amount of water or fuel consumed by the vehicle.

12. The system of claim 7, wherein the one or more processors are further configured to determine, based on the utilization, a billing amount for the utilization.

13. A non-transitory computer readable storage medium comprising logic for determining a utilization of a vehicle by monitoring both an ignition status and a motion status of the vehicle, the logic operable, when executed by a processor, to:
determine an ignition status of a power supply of an engine of the vehicle based at least on an ignition sensor coupled to the vehicle;
determine a motion status of the vehicle based at least on a motion sensor coupled to the vehicle, the motion sensor calibrated according to a predetermined sensitivity level and the motion status determined based on at least a movement of the vehicle;
transmit, the ignition status and the motion status from the vehicle to a monitoring station remotely located from the vehicle, wherein the ignition status indicates that the engine of the vehicle has been on for a first predetermined amount of time and the motion status indicates that the vehicle has not been moving for a second predetermined amount of time;
receive a request to change the ignition status of the vehicle from on to off when the ignition status received by the monitoring station indicates that the engine of the vehicle has been depleting the power supply for a first predetermined amount of time and the motion status received by the monitoring station indicates that the vehicle has not been moving for a second predetermined amount of time;
provide an indication that the change request of the ignition status has been received during a third predetermined amount of time;
determine whether an override of the change request has been received at the vehicle during the third predetermined amount of time;
change the ignition status of the vehicle from on to off after the third predetermined amount of time has elapsed in response to the change request, unless the override has been received during the third predetermined amount of time;
determine the utilization of the vehicle based on the received ignition status, the received motion status, and the change in the ignition status over time; and
determine, based on the utilization, a maintenance schedule for the vehicle.

14. The non-transitory computer readable storage medium of claim 13, the logic further operable to: determine the motion status of the vehicle based on vibrations of the vehicle.

15. The non-transitory computer readable storage medium of claim 13, the logic further operable to: transmit to the monitoring station the determined utilization.

16. The non-transitory computer readable storage medium of claim 13, the logic further operable to: determine the motion status of the vehicle based on detected movements of parts of the vehicle.

17. The non-transitory computer readable storage medium of claim 13, the logic further operable to: determine, based on the utilization, an amount of water or fuel consumed by the vehicle.

18. The non-transitory computer readable storage medium of claim 13, the logic further operable to: determine, based on the utilization, a billing amount for the utilization.

* * * * *